US010030128B2

(12) United States Patent
Zhang et al.

(10) Patent No.: US 10,030,128 B2
(45) Date of Patent: Jul. 24, 2018

(54) ELASTOMER COMPOSITE BLENDS, METHOD AND APPARATUS FOR PRODUCING SAME (71) Applicant: Cabot Corporation, Boston, MA (US)

(72) Inventors: Xuan Zhang, Acton, MA (US); Ting Wang, Lexington, MA (US); Michael D. Morris, Nashua, NH (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/815,080

(22) Filed: Jul. 31, 2015

(65) Prior Publication Data
US 2015/0337122 A1 Nov. 26, 2015

Related U.S. Application Data (63) Continuation of application No. 13/395,567, filed as application No. PCT/US2010/002520 on Sep. 16, 2010.

(60) Provisional application No. 61/276,842, filed on Sep. 17, 2009.

(51) Int. Cl.
| | |
|---|---|
| *C08L 7/02* | (2006.01) |
| *C08J 5/00* | (2006.01) |
| *B01F 5/06* | (2006.01) |
| *B29B 7/32* | (2006.01) |
| *B29B 7/90* | (2006.01) |
| *B60C 1/00* | (2006.01) |
| *B29C 47/10* | (2006.01) |
| *C08C 1/14* | (2006.01) |
| *B29B 7/74* | (2006.01) |
| *C08L 9/06* | (2006.01) |

(52) U.S. Cl.
CPC ............. *C08L 7/02* (2013.01); *B01F 5/0646* (2013.01); *B01F 5/0653* (2013.01); *B29B 7/325* (2013.01); *B29B 7/7495* (2013.01); *B29B 7/90* (2013.01); *B29C 47/1018* (2013.01); *B29C 47/1063* (2013.01); *B60C 1/00* (2013.01); *B60C 1/0016* (2013.01); *C08C 1/14* (2013.01); *C08J 5/00* (2013.01); *C08J 2307/02* (2013.01); *C08J 2409/08* (2013.01); *C08L 9/06* (2013.01); *C08L 2201/52* (2013.01)

(58) Field of Classification Search
CPC ...................................... C08L 7/02; C08J 5/00
USPC ......................................................... 524/501
See application file for complete search history.

(56) References Cited

U.S. PATENT DOCUMENTS

| | | |
|---|---|---|
| 3,108,982 A | 10/1963 | Barclay |
| 4,029,633 A | 6/1977 | Hagopian et al. |
| 4,271,213 A | 6/1981 | Grimm et al. |
| 4,375,497 A | 3/1983 | Sandstrom |
| 4,578,411 A | 3/1986 | Budd et al. |
| 5,753,742 A | 5/1998 | Bumanlag |
| 5,977,238 A | 11/1999 | Labauze |
| 6,013,718 A | 1/2000 | Cabioch et al. |
| 6,048,923 A | 4/2000 | Mabry et al. |
| 6,075,084 A | 6/2000 | Mabry et al. |
| 6,365,663 B2 | 4/2002 | Mabry et al. |
| 6,503,973 B2 | 1/2003 | Robert et al. |
| 6,521,691 B1 | 2/2003 | Agostini et al. |
| 6,548,584 B1 | 4/2003 | Gorl |
| 6,555,606 B1 | 4/2003 | Agostini |
| 6,753,375 B2 | 6/2004 | Agostini |
| 6,800,126 B2 | 10/2004 | Magnus et al. |
| 6,815,473 B2 | 11/2004 | Robert et al. |
| 6,841,606 B2 | 1/2005 | Yanagisawa et al. |
| 6,929,783 B2 | 8/2005 | Chung et al. |
| 7,105,595 B2 | 9/2006 | Mabry et al. |
| 7,312,271 B2 | 12/2007 | Chen et al. |
| 7,407,611 B2 | 8/2008 | Innerebner et al. |
| 2003/0125446 A1* | 7/2003 | Wang ................... C08K 3/04 524/495 |
| 2005/0148723 A1 | 7/2005 | Kondou |
| 2006/0079608 A1 | 4/2006 | Chung et al. |
| 2006/0089445 A1 | 4/2006 | Gandon-Pain |
| 2006/0111475 A1 | 5/2006 | Mabry et al. |
| 2006/0143938 A1 | 7/2006 | Karato et al. |
| 2006/0225615 A1 | 10/2006 | Raman et al. |
| 2006/0281850 A1 | 12/2006 | Tokunaga et al. |
| 2007/0106014 A1 | 5/2007 | Kanenari et al. |
| 2007/0173567 A1 | 7/2007 | Ishino |
| 2009/0062428 A1 | 3/2009 | Zhang et al. |

FOREIGN PATENT DOCUMENTS

| | | |
|---|---|---|
| EP | 1489102 | 12/2004 |
| EP | 1816144 | 8/2007 |
| EP | 1834980 | 9/2007 |

(Continued)

OTHER PUBLICATIONS

S. Wolff and M.J. Wang, Rubber Chem. Technol., 1992, vol. 65, p. 329.
A.I. Medalia, "Electrical Conduction in Carbon Black Composites", Rubber Chemistry and Technology, 1986, vol. 59, p. 432.
International Preliminary Report on Patentability for International Application No. PCT/US2010/002520, dated Mar. 29, 2012.

(Continued)

*Primary Examiner* — Deve E Valdez (57) ABSTRACT

A wet mix elastomer composite comprising carbon black dispersed in an elastomer including a blend of a natural rubber and styrene-butadiene rubber. When the wet mix elastomer composite is processed with CTV Method 1, the vulcanized wet mix elastomer composite exhibits a resistivity that A) has a natural logarithm satisfying the equation $\ln(\text{resistivity}) \geq -0.1(\text{loading})+x$, where x is 14, or B) is at least 2.9 times greater than the resistivity of a vulcanized dry mix elastomer composite having the same composition and prepared using Comparative CTV Method 1.

4 Claims, 3 Drawing Sheets

(56) References Cited

FOREIGN PATENT DOCUMENTS

| | | |
|---|---|---|
| FR | 2588008 | 4/1987 |
| JP | 2001/323071 A | 11/2001 |
| JP | 2005220187 | 8/2005 |
| JP | 2006/096926 A | 4/2006 |
| JP | 2006152211 | 6/2006 |
| JP | 2006152212 | 6/2006 |
| JP | 2006169483 | 6/2006 |
| JP | 2006183036 | 7/2006 |
| JP | 2006213878 | 8/2006 |
| JP | 2006213879 | 8/2006 |
| JP | 2007154089 | 6/2007 |
| JP | 2007154095 | 6/2007 |
| JP | 2007197622 | 8/2007 |
| WO | WO96/18688 | 7/1996 |
| WO | WO 2009/032178 A1 | 3/2009 |
| WO | WO2003/050182 | 8/2009 |
| WO | WO2009/099623 | 8/2009 |
| WO | WO2011/034589 | 3/2011 |

OTHER PUBLICATIONS

Mortensen, ed., *Concise Encyclopedia of Composite Materials*, Second Edition, Elsevier, 2007, pp. 818-819.

\* cited by examiner

ELASTOMER COMPOSITE BLENDS, METHOD AND APPARATUS FOR PRODUCING SAME

This application is a continuation of and claims priority to U.S. patent application Ser. No. 13/395,567, filed on Mar. 12, 2012, which is a § 371 national phase application of PCT/US2010/002520, filed on Sep. 16, 2010, which claims the benefit of U.S. Provisional Patent Application No. 61/276,842 filed Sep. 17, 2009.

BACKGROUND OF THE INVENTION

1. Field of the Invention

This invention pertains to elastomer composites including a blend of elastomers, and methods of making such composites.

2. Description of the Related Art

Numerous products of commercial significance are formed of elastomeric compositions wherein particulate filler is dispersed in any of various synthetic elastomers, natural rubber or elastomer blends. Carbon black, for example, is widely used as a reinforcing agent in natural rubber and other elastomers. It is common to produce a masterbatch, that is, a premixture of filler, elastomer and various optional additives, such as extender oil. Carbon black masterbatch is prepared with different grades of commercially available carbon black which vary both in surface area per unit weight and in structure, which describes the size and complexity of aggregates of carbon black formed by the fusion of primary carbon black particles to one another. Numerous products of commercial significance are formed of such elastomeric compositions of carbon black particulate filler dispersed in natural rubber. Such products include, for example, vehicle tires wherein different elastomeric compositions may be used for the tread portion, sidewalls, wire skim and carcass. Other products include, for example, engine mount bushings, conveyor belts, windshield wipers and the like.

There are a variety of methods for producing masterbatch. In one method, disclosed in U.S. Pat. No. 6,048,923, the contents of which are incorporated by reference herein, a continuous flow of a first fluid including an elastomer latex is fed to the mixing zone of a coagulum reactor. A continuous flow of a second fluid including a carbon black slurry is fed under pressure to the mixing zone to form a mixture with the elastomer latex. The mixing of the two fluids is sufficiently energetic to substantially completely coagulate the elastomer latex with the carbon black prior to a discharge end of the coagulum reactor. As disclosed in U.S. Pat. No. 6,929,783, the coagulum may then be fed to a dewatering extruder.

For some applications, it is desirable to employ blends of elastomers to optimize the mechanical properties of the masterbatch and/or a vulcanized rubber product of the masterbatch. Blends of elastomers may be produced by dry-mixing two polymers together. Alternatively, blends may be produced by co-coagulating a mixture of elastomer latices (see, e.g., U.S. Pat. No. 4,271,213) or by recovering a polymer blend from a mixture of an elastomer latex and a solution containing a second polymer (see, e.g., U.S. Pat. No. 5,753,742). However, none of these references disclose a wet masterbatch method of combining a filler with two or more elastomers. Rather, the polymer blends produced by these methods may be dry mixed with filler to form a masterbatch. However, dry mixing can reduce polymer molecular weight and degrade polymer properties.

U.S. Pat. No. 6,521,691 discloses a wet masterbatch method in which two polymer emulsions and a filler slurry may be combined and then coagulated to form a masterbatch. Similarly, U.S. Pat. No. 6,800,126 discloses that carbon black aggregates may be blended with an oil and a low-molecular weight elastomer latex to form a preblend, which preblend may be combined with an emulsion of a diene-based elastomer. A composite of the elastomer and the carbon black is then recovered from the mixture. U.S. Pat. No. 4,578,411 discloses a method in which an elastomer latex, an elastomer solution, and a filler are combined, following which a composite of the two elastomers with the filler is recovered. However, all of these references disclose the combination of the filler with the elastomer and the coagulation of the latex as separate processing steps. Between these two process stages, the filler can flocculate in the emulsion to the detriment of its even distribution in the final composite.

U.S. Pat. No. 6,048,923 discloses a wet masterbatch method in which coagulation ensues upon introduction of a filler slurry to an elastomer latex, resulting in superior dispersion of filler within the elastomer composite. No coagulant is required to form this "wet mix" elastomer composite. The '923 patent discloses that blends of elastomer latices may be combined with the filler slurry to form a coagulum. However, because natural rubber latex is essentially a biological material, it contains a number of dissolved substances such as magnesium, potassium, phosphate, and sulfate ions, fatty acids, amino acids, carbohydrates, peptides, etc. The high ionic strength of the aqueous carrier can cause synthetic latices with which natural rubber latex is combined to coagulate before the filler slurry is introduced to the elastomer latex blend. Such synthetic latices are said to be incompatible with natural rubber latex. While it is possible to render the two latices compatible by adding surfactant to either the synthetic or the natural latex, the additional surfactant makes the latex more difficult to coagulate and increases the concentration of surfactant in the final rubber product. Thus, it is desirable to have a method of producing elastomer composite masterbatches incorporating a blend of materials that is not susceptible to the problem of early coagulation but which still results in a homogeneous dispersion of filler within the elastomer.

SUMMARY OF THE INVENTION

In one embodiment, a wet mix elastomer composite includes carbon black dispersed in an elastomer including a blend of a natural rubber and styrene-butadiene rubber. When the wet mix elastomer composite is processed with CTV Method 1, the vulcanized wet mix elastomer composite exhibits a resistivity that A) has a natural logarithm satisfying the equation ln(resistivity)≥−0.1(loading)+x, where x is 14, or B) is at least 2.9 times greater than the resistivity of a vulcanized dry mix elastomer composite having the same composition and prepared using Comparative CTV Method 1.

In another embodiment, a vulcanized wet mix elastomer composite includes carbon black dispersed in elastomer. The elastomer includes a blend of a natural rubber and styrene-butadiene rubber. The vulcanized wet mix elastomer composite exhibits a ratio of T300/T100 that is at least 18% greater than the same ratio for a vulcanized dry mix elastomer composite having the same composition as the vulcanized wet mix elastomer composite.

The elastomer composite may include natural rubber and about 1 to about 36 wt % styrene-butadiene rubber, for example about 20 to about 36 wt % styrene-butadiene rubber with respect to the total rubber content. The elastomer composite may exhibit a macrodispersion of less than 0.1% undispersed area.

In another embodiment, a method for preparing an elastomer composite includes feeding a continuous flow of a first fluid comprising a first elastomer latex to a mixing zone of a coagulum reactor, feeding a continuous flow of a second fluid comprising a second elastomer latex to the mixing zone, feeding a continuous flow of a third fluid comprising a particulate filler slurry to the mixing zone, allowing the first elastomer latex and the second elastomer latex to coagulate with the particulate filler, and discharging a flow of coagulated wet mix elastomer composite from a discharge end of the coagulum reactor.

The first elastomer latex may include natural rubber latex, and the second elastomer latex may include a synthetic elastomer latex. The particulate filler may include carbon black. The first fluid and the second fluid may combine with the third fluid to form a mixture, and the first fluid and the second fluid may combine with the third fluid substantially simultaneously.

In another embodiment, an elastomer composite is prepared by a method including feeding a continuous flow of a first fluid comprising a first elastomer latex to a mixing zone of a coagulum reactor, feeding a continuous flow of a second fluid comprising a second elastomer latex to the mixing zone, feeding a continuous flow of a third fluid comprising a particulate filler slurry to the mixing zone, allowing the first elastomer latex and the second elastomer latex to coagulate with the particulate filler, and discharging a flow of coagulated wet mix elastomer composite from a discharge end of the coagulum reactor.

The first elastomer latex may include natural rubber latex, and the second elastomer latex may include a synthetic elastomer latex. The particulate filler may include carbon black. The first fluid and the second fluid may combine with the third fluid to form a mixture, and the first fluid and the second fluid may combine with the third fluid substantially simultaneously. Alternatively, the first fluid and the third fluid may combine to form a mixture, and the second fluid may combine with the mixture. The first elastomer latex and the second elastomer latex may be incompatible.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

In one embodiment, an elastomer composite is prepared by feeding a continuous flow of a first fluid comprising a first elastomer latex to a mixing zone of a coagulum reactor, feeding a continuous flow of a second fluid comprising a second elastomer latex to the mixing zone, feeding a continuous flow of a third fluid comprising a particulate filler slurry to the mixing zone, allowing the first elastomer latex and the second elastomer latex to coagulate with the particulate filler, and discharging a flow of elastomer composite from a discharge end of the coagulum reactor. We have found that this method allows the production of elastomer composite blends, for example, blends of natural rubber latex and styrene-butadiene copolymers, from incompatible polymer emulsions.

Characterization of Particle Distribution in Filled Vulcanizates

Improvements in rubber reinforcement are reflected in the ratio of the stresses at different elongations. For carbon black-filled vulcanizates, stresses at given elongations reflect, among other things, the effect of filler morphology (particle size and structure) and surface activity, which determines filler-polymer and aggregate-aggregate interaction. The ratio of the stress at 300% elongation to that at 100% elongation, T300/T100, provides a useful approach for quantifying the degree of polymer-filler interaction because the factors governing the stresses at different elongations are different. Structure affects the occlusion of rubber in the filler aggregates. Increased occlusion increases the effective filler volume fraction, a description of the extent to which filler actually interacts with the rubber matrix and influences the properties of the rubber matrix composite, and thus the stresses at given elongations for the filled vulcanizate. For two compounds prepared with the same polymer and filled with the same carbon black at the same loading level or volume fraction, the effects of structure and surface area on stress should be the same. As a result, any difference in stresses at different strains can be attributed to the crosslinking density of the polymer matrix, polymer-filler interaction, and aggregate-aggregate interaction, the last of which leads to filler agglomeration. At low strain, the agglomerates are not broken down, and the rubber trapped in the agglomerates can be treated as filler. This increases the effective volume of the fillers, thus increasing the stress at a given elongation (i.e., strain). The filler agglomerates gradually break with increasing strain so that the effect of filler agglomeration on stress at given elongation will decrease and finally disappear at about 100% elongation. On the other hand, at higher elongation, e.g., at 300% elongation, a different mechanism is involved. In the absence of interaggregate association, the interaction between the polymer and filler has a greater influence on the stress. Where the interaction between the polymer and the filler is weak, high strain leads to slippage and deattachment (dewetting) of rubber molecules on the black surface, reducing stress for a given strain. The effect of cross-link density on stress is the about same at both 100% and 300% strain. As a result, the ratio T300/T100 provides a measure of the in-rubber polymer-filler interaction (S. Wolff and M.-J. Wang, *Rubber Chem. Technol.*, 65, 329 (1992)).

We have also found that improvements to the filled rubber are reflected in the microstructure of the composite. As described in U.S. Pat. No. 6,048,923, rubber composites produced by the method disclosed therein exhibit improved macrodispersion of filler with respect to dry mixed rubbers. Macrodispersion, as indicated by percent undispersed area D(%), describes the dispersion of filler within a composite at length scales of 10 microns or greater. Without being bound by any particular theory, it is believed that good macrodispersion results from the breakup of filler pellets and the uniform distribution of the resulting material within the elastomer matrix. We have found that improvements in the distribution of filler with respect to shorter length scales are correlated with improvements in the mechanical properties of the bulk product. This feature of the composite microstructure is termed microdispersion. Without being bound by any particular theory, it is believed that improvements in microdispersion result from better separation of individual filler aggregates and/or small clusters of aggregates (i.e., agglomerates) within the composite.

As used herein, the term "aggregate" refers to the smallest dispersible unit of the filler. For example, carbon black aggregates are made up of primary particles of carbon black and generally cannot be broken into smaller pieces by mechanical forces. As used herein, the term "agglomerate" refers to a plurality of aggregates in physical contact with one another and held together by physical forces. These agglomerates may be broken by mechanical forces into smaller units or particles; the smaller units may be aggregates, smaller agglomerates, or both.

The difference in conductivity between carbon black and rubber may be exploited to characterize microdispersion in carbon black-rubber composites. The conductivity of such composites depends primarily on the concentration and morphology (e.g., surface area, particle size, and structure) of the carbon black. In addition, the conductivity of these composites is influenced by the state of dispersion of the carbon black in the rubber matrix. The conductivity of a carbon black-rubber composite first increases, then decreases as the carbon black becomes more dispersed in the matrix (A. I. Medalia, "Electrical Conduction in Carbon Black Composites," *Rubber Chemistry and Technology*, 1986, Vol. 59, p. 432). The initial increase is attributed to the increasing distribution and dispersion of larger carbon black agglomerates, thereby decreasing the average distance between particles in the composite. Further improvements in dispersion lead to a decrease in conductivity. As noted above, this is attributed to the separation of small groups of individual carbon black aggregates within the system (Medalia, 1986).

In certain embodiments, a wet mix elastomer composite is prepared from natural rubber and carbon black. When the elastomer composite is processed using a standardized method, CTV Method 1 (defined below), the resulting vulcanized wet mix elastomer composite exhibits a resistivity satisfying ln(resistivity)≥−0.1(loading)+x, where x is 14. Alternatively or in addition, the resistivity may also satisfy ln(resistivity)≥−0.1(loading)+x, where x is 14.5. In addition, the resistivity may satisfy ln(resistivity)≤−0.1(loading)+y, where y is 17. Alternatively or in addition, y may be 16. Alternatively or in addition, the vulcanized wet mix elastomer composite exhibits a resistivity that is at least about 2.9 times higher, for example, at least about 3.5 times higher, at least about 4 times higher, at least about 4.5 times higher, or at least about 5 times higher than the resistivity of a vulcanized dry mix elastomer composite having the same composition and prepared using a comparative method, CTV Comparative Method 1 (defined below). For example, the resistivity may be from about 3 times to about 6 times higher, from about 4 times to about 5 times higher, from about 2 times to about 5.5 times higher, or from about 2.5 times to about 4.5 times higher for the vulcanized wet mix composite than for the vulcanized dry mix composite. In any of these embodiments, the wet mix elastomer composite may include less than 2 phr of surfactant, for example, less than 1.5 phr of surfactant, less than 1 phr of surfactant, less than 0.75 phr of surfactant, less than 0.5 phr of surfactant, or from 0.25 to 2 phr of surfactant.

As used herein, CTV Method 1 means compounding a masterbatch in a 1.6 L Banbury mixer using the formulation in Table 1 and the procedure in Table 2. After each Banbury mixing stage, compounds are sheeted on a 2-roll mill operated at ambient temperature and about 40 rpm with a nip gap of about 2 mm using 4 cross-cuts and 2 end-rolls, with a rest time between stage 1 and stage 2 mixing from 4-6 hours. Compounds are then cured in a press at 150° C. using a mold with a 2 mm thick spacer for a time determined by a conventional rubber rheometer (i.e., T90+10% of T90).

TABLE 1

| Ingredient | Phr |
| --- | --- |
| Rubber | 100 |
| ZnO | 4 |
| Stearic acid | 2 |
| 6PPD* (antioxidant) | 1.5 |
| TBBS** (accelerator) | 0.8 |
| Sulfur | 1.2 |

*N-(1,3-dimethylbutyl)-N'-phenyl-p-phenylenediamine
**N-tert-butyl-2-benzothiazolesulphenamide

TABLE 2

| | Time (min) | Operation |
| --- | --- | --- |
| | | Farrel BR Banbury mixer (1600 cc), 75% fill factor, 80 rpm, 60° C. |
| Stage 1 | 0 | Add rubber-carbon black masterbatch |
| | 1 | Add zinc oxide, stearic acid and 6PPD |
| | 1.5 | Sweep |
| | 2.5 | Dump |
| | | Roll mill using 4 cross-cuts and 2 end rolls |
| | | Farrel BR Banbury mixer (1600 cc), 65% fill factor, 60 rpm, 50° C. |
| Stage 2 | 0 | Add stage 1 compound, sulfur and accelerator |
| | 1 | Dump |
| | | Roll mill using 4 cross-cuts and 2 end rolls |

As used herein, CTV Comparative Method 1 means preparing a vulcanized elastomer composite in a 1.6 L Banbury mixer using the formulation in Table 1 and the procedure in Table 3. After each Banbury mixing stage, compounds are sheeted on a t-roll mill operated at ambient temperature and about 40 rpm with a nip gap of about 2 mm using 4 cross-cuts and 2 end-rolls, with a rest time between stage 1 and stage 2 mixing from 4-6 hours. Compounds are then cured in a press at 150° C. using a mold with a 2 mm thick spacer for a time determined by a conventional rubber rheometer (i.e., T90+10% of T90).

TABLE 3

| | |
|---|---|
| Stage 1 | |
| Fill factor (%) | 75 |
| Rotor speed (rpm) | 80 |
| Start temperature (° C.) | 60 |
| Time NR addition (s) | 0 |
| Time CB addition (s) | 30 |
| Time smalls addition (s) | 150 |
| Time for sweep (s) | 60, 180 |
| Dump time (s) | 240 |
| Stage 2 | |
| Fill factor (%) | 65 |
| Rotor speed (rpm) | 60 |
| Start temperature (° C.) | 50 |
| Time masterbatch and curatives (s) | 0 |
| Dump time (s) | 60 |

Handling of the vulcanized compounds can affect resistivity. To avoid skewing test results, the compounds should not be stored under conditions of high humidity or high temperature (e.g., greater than about 30 or 40° C.) for extended periods of time, nor should they be significantly mechanically deformed.

Wet mix elastomer composite blends prepared according to certain embodiments of the invention exhibit a ratio of T300 to T100 that is at least about 18% greater than the same ratio for a vulcanized dry mix elastomer composite blend having the same composition. For example, the ratio T300/T100 may be at least about 20% greater, at least about 25% greater, at least about 30% greater, or at least about 35% greater for a vulcanized wet mix elastomer blend than for a dry mix elastomer composite blend. Alternatively or in addition, the ratio T300/T100 may be from about 20% to about 30% greater, from about 25% to about 35% greater, from about 30% to about 40% greater, or from about 35% to about 45% greater for a wet mix elastomer composite blend than for a dry mix elastomer composite blend. In any of these embodiments, the wet mix elastomer composite may include less than 2 phr of surfactant, for example, less than 1.5 phr of surfactant, less than 1 phr of surfactant, less than 0.75 phr of surfactant, less than 0.5 phr of surfactant, or from 0.25 to 2 phr of surfactant.

As used herein, the term "wet mix elastomer composite blend" refers to an elastomer composite blend which has been prepared by a wet masterbatch process. In contrast, the term "dry mix elastomer composite blend" refers to an elastomer composite blend which has been prepared by combining two dry elastomers (e.g., less than 1% water) and particulate filler in powder form or by combining dry elastomer with an elastomer masterbatch.

Preparation of Elastomer Composite Blends

Figure 1:
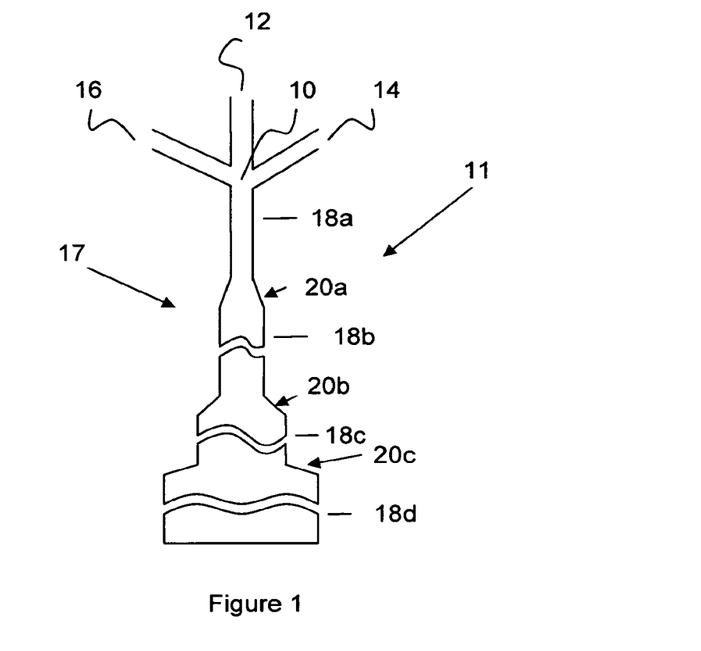
FIG. 1 is a schematic diagram of an apparatus for producing elastomer composite blends according to an exemplary embodiment of the invention.

As shown in FIG. 1, a particulate filler slurry is fed into a mixing portion 10 of a coagulum reactor 11 via a filler feed line 12. A first elastomer latex is fed into mixing portion 10 via first latex feed line 14. A second elastomer latex is fed into mixing portion 10 via second latex feed line 16. The two latices coagulate in the mixing portion 10, and the coagulum, including both elastomers and particulate filler, proceeds through a diffuser portion 17 of coagulum reactor 11. As shown in FIG. 1, the diffuser portion 17 has a series of sections 18a-18d, each one having progressively higher diameter than the previous section 18. Preferably, transition regions 20a-c provide a gradual increase in diameter from one section 18 to the next. One of skill in the art will recognize that the diffuser portion may have greater or fewer sections 18 than shown in the figure. The elastomer composite coagulum emerges from diffuser portion 17 as "masterbatch crumb".

In one embodiment, the masterbatch crumb is passed from coagulum reactor 11 to a de-watering extruder via a simple gravity drop or other suitable apparatus known to those of skill in the art. The dewatering extruder may bring the elastomer composite from, e.g., approximately 70-85% water content, to a desired water content, e.g., approximately 1% to 20% water content. The optimal water content may vary with the elastomer employed, the type of filler, and the desired downstream processing procedure. Suitable de-watering extruders are well known and commercially available from, for example, the French Oil Mill Machinery Co. (Piqua, Ohio, USA).

After de-watering, the resulting dewatered coagulum may be dried. In certain embodiments, the dewatered coagulum is simply thermally dried. Preferably, the dewatered coagulum is mechanically masticated while drying. For example, the dewatered coagulum may be mechanically worked with one or more of a continuous mixer, an internal mixer, a twin screw extruder, a single screw extruder, or a roll mill. Suitable masticating devices are well known and commercially available, including for example, a Unimix Continuous Mixer and MVX (Mixing, Venting, eXtruding) Machine from Farrel Corporation of Ansonia, Conn., a long continuous mixer from Pomini, Inc., a Pomini Continuous Mixer, twin rotor corotating intermeshing extruders, twin rotor counterrotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer. Alternative masticating apparatus suitable for use with various embodiments of the invention will be familiar to those of skill in the art. Exemplary methods for mechanically masticating dewatered composite are disclosed in U.S. Pat. Nos. 6,929,783 and 6,841,606, and PCT Application No. U.S. Ser. No. 09/000,732, the contents of all of which are incorporated herein by reference.

In certain embodiments, additives can be combined with the dewatered coagulum in the mechanical mixer. Specifically, additives such as filler (which may be the same as, or different from, the filler used in the coagulum reactor; exemplary fillers include silica and zinc oxide, with zinc oxide also acting as a curing agent), other elastomers, other or additional masterbatch, antioxidants, antiozonants, plasticizers, processing aids (e.g., stearic acid, which can also be used as a curing agent, liquid polymers, oils, waxes, and the like), coupling agents, resins, flame-retardants, extender oils, lubricants, and a mixture of any of them, can be added in the mechanical mixer. In certain other embodiments, additional elastomers can be combined with the dewatered coagulum to produce elastomer blends. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, and propylene and the like. Methods of producing masterbatch blends are disclosed in our commonly owned U.S. Pat. Nos. 7,105,595, 6,365,663, and 6,075,084. Alternatively or in addition, traditional compounding techniques may be used to combine vulcanization agents and other additives known in the art with the dewatered coagulum or, where a masticating apparatus is used to dry the material, the resulting masticated masterbatch, depending on the desired use.

Figure 2A:
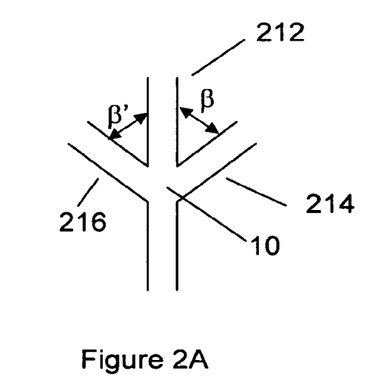
FIGS. 2A and 2B are schematic diagrams of apparatus for injection of a second elastomer latex into a coagulum according to an exemplary embodiment of the invention.

The mixing portion 10 of the coagulum reactor 11 may be configured in several ways. FIG. 2A shows an exemplary configuration in which materials emerging from filler feed line 212, first latex feed line 214, and second latex feed line 216 all combine with one another substantially simultaneously. The angle beta between first latex feed line 214 and filler feed line 212 and the angle beta' between second latex feed line 216 and filler feed line 212 may be varied independently. Either of these angles may vary from greater than 0° to less than 180°. Preferably, beta and beta' are varied independently from 30° to 90°. The optimal angle may be determined in part by the relative flow rates of the three fluids and their compositions.

Figure 3:
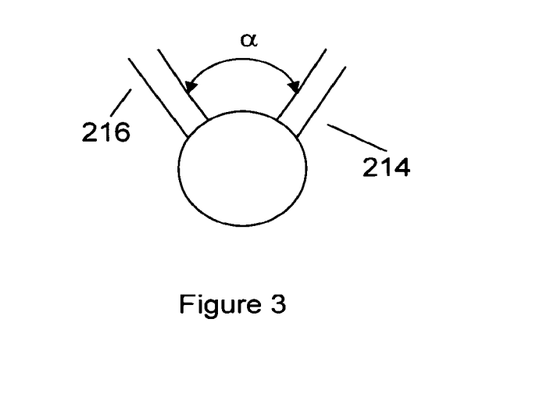
FIG. 3 is a schematic diagram of a top view of the apparatus depicted in FIGS. 2A and 2B.

The angle alpha between the two latex feed lines may also be varied from greater than 0° to less than 180° (FIG. 3). Alternatively or in addition, a plurality of latex feed lines may be used for either or both of the first and second elastomer latex streams.

Figure 2B:
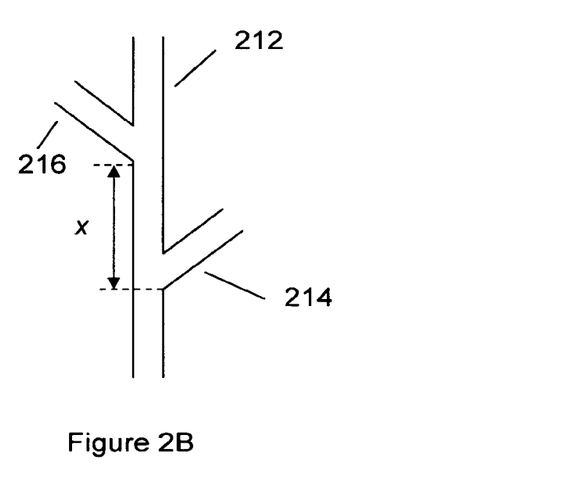

Alternatively or in addition, the injection points of the two latices may be staggered with respect to the injection of the filler slurry (FIG. 2B). For example, the outlet of first latex feed line 214 and second latex feed line 216 may be spaced by a distance x.

Preferably, the first elastomer latex is prepared from a natural rubber latex. The term "diene" elastomer or rubber should be understood as meaning, in a known way, an (one or more are understood) elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Thus natural rubber belongs to the category of "highly unsaturated" diene elastomer. Exemplary natural rubber latices include but are not limited to field latex, latex concentrate (produced, for example, by evaporation, centrifugation or creaming), skim latex (a by-product of the centrifugation of natural rubber latex) and blends of any two or three of these in any proportion. The latex should be appropriate for the intended purpose or application of the final rubber product. The latex is provided typically in an aqueous carrier liquid. Selection of a suitable latex or blend of latices will be well within the ability of those skilled in the art given the benefit of the present disclosure and the knowledge of selection criteria generally well recognized in the industry.

The natural rubber latex may also be chemically modified in some manner. For example, it may be treated to chemically modify or reduce various non-rubber components, or the rubber molecules themselves may be modified with various monomers or other chemical groups such as chlorine. Exemplary methods of chemically modifying natural rubber latex are disclosed in European Patent Publications Nos. 1489102, 1816144, and 1834980, Japanese Patent Publications Nos. 2006152211, 2006152212, 2006169483, 2006183036, 2006213878, 2006213879, 2007154089, and 2007154095, U.S. Pat. Nos. 6,841,606 and 7,312,271, and U.S. Patent Publication No. 2005-0148723. Other methods known to those of skill in the art may be employed as well.

Preferably, the second elastomer latex is prepared using synthetic elastomer latex. The elastomer may have a glass transition temperature (Tg) as measured by differential scanning calorimetry (DSC) ranging from about −120° C. to about 20° C. Synthetic diene elastomer of the composition in accordance with the invention is preferably chosen from the group of the highly unsaturated diene elastomers consisting of polybutadienes (abbreviated to "BR"), synthetic polyisoprenes (IR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or of polyether groups (such as described, for example, in U.S. Pat. No. 6,503,973). Mention may also be made, as other examples of such functionalized elastomers, of elastomers (such as SBR, BR, NR or IR) of the epoxidized type.

The following are preferably suitable: polybutadienes, in particular those having a content of 1,2-units from 4% to 80% or those having a content of cis-1,4-units of greater than 80%, polyisoprenes, butadiene/styrene copolymers in particular those having a styrene content from 5% to 70% by weight, for example, from 10% to 50% by weight, more particularly from 20% to 40% or from 23% to 28% by weight, a content of 1,2-bonds of the butadiene part from 4% to 65% and a content of trans-1,4-bonds from 20% to 80%, butadiene/isoprene copolymers, in particular those having an isoprene content from 5% to 90% by weight and a glass transition temperature ("Tg"-measured according to ASTM D 3418-82) of −40° C. to −80° C., or isoprene/styrene copolymers, in particular those having a styrene content from 5% to 50% by weight and a Tg from −25° C. to −50° C.

In the case of butadiene/styrene/isoprene copolymers, those having a styrene content from 5% to 50% by weight and more particularly from 10% to 40%, an isoprene content from 15% to 60% by weight and more particularly from 20% to 50%, a butadiene content from 5% to 50% by weight and more particularly from 20% to 40%, a content of 1,2-units of the butadiene part from 4% to 85%, a content of trans-1,4-units of the butadiene part from 6% to 80%, a content of 1,2-plus 3,4-units of the isoprene part from 5% to 70% and a content of trans-1,4-units of the isoprene part from 10% to 50%, and more generally any butadiene/styrene/isoprene copolymer having a Tg from −20° C. to −70° C., are suitable in particular.

While it is expected that random copolymers will be more commonly exploited, emulsions of block copolymers are also suitable for use according to the teachings herein. Oil extended derivatives of any of the synthetic elastomers described herein are also suitable. In some embodiments, it may be desirable to inject a coagulant, for example, a salt or acid solution, along with the latex stream, to promote coagulation of the elastomer.

The particulate filler fluid may be a carbon black slurry or any other suitable filler in a suitable carrier fluid. Selection of the carrier fluid will depend largely upon the choice of particulate filler and upon system parameters. Both aqueous and non-aqueous liquids may be used, with water being preferred in many embodiments in view of its cost, availability and suitability of use in the production of carbon black and certain other filler slurries. Small amounts of water-miscible organic solvents may also be included in aqueous carrier fluids.

Selection of the particulate filler or mixture of particulate fillers will depend largely upon the intended use of the elastomer masterbatch product. As used here, particulate filler can include any material which is appropriate for use in the masterbatch process. Suitable particulate fillers include, for example, conductive fillers, reinforcing fillers, fillers comprising short fibers (typically having an L/D aspect ratio less than 40), flakes, etc. In addition to carbon black and silica-type fillers, discussed in more detail below, fillers can be formed of clay, glass, polymer, such as aramid fiber, etc. It is expected that any filler suitable for use in elastomer compositions may be incorporated into elastomer composites according to various embodiments of the invention. Of course, blends of the various particulate fillers discussed herein may also be used.

When a carbon black filler is used, selection of the carbon black will depend largely upon the intended use of the elastomer masterbatch product. Optionally, the carbon black filler can include also any material which can be slurried and combined with a latex. Exemplary particulate fillers include but are not limited to carbon black, fumed silica, precipitated silica, coated carbon black, chemically functionalized carbon blacks, such as those having attached organic groups, and silicon-treated carbon black, either alone or in combination with each other. Exemplary carbon blacks include ASTM N100 series-N900 series carbon blacks, for example N100 series carbon blacks, N200 series carbon blacks, N300 series carbon blacks, N700 series carbon blacks, N800 series carbon blacks, or N900 series carbon blacks. Carbon blacks sold under the Regal®, Black Pearls®, Spheron®, Sterling®, and Vulcan® trademarks available from Cabot Corporation, the Raven®, Statex®, Furnex®, and Neotex® trademarks and the CD and HV lines available from Columbian Chemicals, and the Corax®, Durax®, Ecorax®, and Purex® trademarks and the CK line available from Evonik (Degussa) Industries, and other fillers suitable for use in rubber or tire applications, may also be exploited for use with various embodiments. Suitable chemically functionalized carbon blacks include those disclosed in International Application No. PCT/US95/16194 (WO 96/18688), the disclosure of which is hereby incorporated by reference.

Both silicon-coated and silicon-treated carbon blacks may be employed in various embodiments. In silicon-treated carbon black, a silicon containing species such as an oxide or carbide of silicon is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silicon-coated carbon blacks.

The materials described herein as silicon-treated carbon blacks are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. A variety of silicon-treated blacks are available from Cabot Corporation under the name Ecoblack™. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. No. 6,929,783.

One or more additives also may be pre-mixed, if suitable, with the particulate slurry or with either the first or second elastomer latex fluids or may be combined with the mixture of these during coagulation. Additives also can be mixed into the coagulum. Numerous additives are well known to those skilled in the art and include, for example, antioxidants, antiozonants, plasticizers, processing aids (e.g., liquid polymers, oils and the like), resins, flame-retardants, extender oils, lubricants, and a mixture of any of them. Exemplary additives include but are not limited to zinc oxide and stearic acid. The general use and selection of such additives is well known to those skilled in the art.

The ratio of the dry rubber contents of the first and second elastomers (i.e., the amount of rubber contributed to the coagulum by the first and second elastomer latices) may be adjusted by adjusting the relative flow rates of the two elastomers, by diluting one of the two elastomer latices, e.g., with water and/or skim latex, or both. Other variables that may be manipulated to optimize the filler loading include the absolute flow rate of the elastomer latex streams and filler slurry (e.g., the production rate) and the relative flow rate of the elastomer latex streams and filler slurry (e.g., the filler loading).

The amount of filler in the elastomer composite blend may be any amount of filler that is used to make elastomer composites. For example, rubbers may be produced with at least 30 parts per hundred of rubber (phr), at least 40 phr, at least 50 phr, at least 55 phr, at least 60 phr, at least 65 phr, at least 70 phr, at least 75 phr, at least 80 phr, at least 85 phr, at least 90 phr, at least 95 phr, or at least 100 phr of filler.

The resulting elastomer composite blend may be used in or produced for use in various parts of a tire, for example, tires, tire treads, tire sidewalls, wire-skim for tires, and cushion gum for retread tires. Additional, non-tire, applications for these elastomer composite blends include but are not limited to rubber components of engine mounts, tank tracks, mining belts, rubber components of hydro-mounts, bridge bearings, seismic isolators, tracks and track pads for track-propelled equipment such as bulldozers, etc., mining equipment such as screens, mining equipment linings, conveyor belts, chute liners, slurry pump liners, mud pump components such as impellers, valve seats, valve bodies, piston hubs, piston rods, and plungers, impellers for various applications such as mixing slurries and slurry pump impellers, grinding mill liners, cyclones and hydrocyclones, and expansion joints, marine equipment such as linings for pumps (e.g., outboard motor pumps, dredge pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other elastomer applications where abrasion resistance is desired. Various types of parts such as rollers, cams, shafts, and pipes may also benefit from the use of certain embodiments of the invention, as may applications in which rubber is bonded to metal components, such as tread bushings for vehicles.

Elastomer composite blends produced according to the various embodiments of the invention may also comprise all or a portion of the usual additives generally used in elastomer compositions intended for the manufacture of tires and in the non-tire applications described above, such as, for example, protection agents, such as antiozone waxes, chemical antiozonants, antioxidants, reinforcing resins, methylene acceptors (for example phenolic novolak resin) or methylene donors (for example HMT or H3M), a crosslinking system based either on sulphur or on donors of sulphur and/or peroxide and/or bismaleimides, vulcanization accelerators, or vulcanization activators.

The elastomer composite blends may also comprise coupling activators when a coupling agent is used, agents for covering the inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

The present invention will be further clarified by the following examples which are intended to be only exemplary in nature

EXAMPLES

Carbon Black Slurry Preparation

Dry N234 carbon black (Cabot Corporation, Boston, Mass.) was mixed with water and ground to form a slurry having a concentration of about 10-15%. The slurry was fed to a homogenizer at an operating pressure of around 3000 psig such that the slurry was introduced as a jet into the mixing zone to produce a finely ground carbon black slurry. The carbon black flow rate was adjusted to about 690-1160 kg/hr to modify final carbon black loading levels. The actual carbon black loading levels were determined by nitrogen pyrolysis or thermogravimetric analysis (TGA).

Natural Rubber Latex Delivery

Field latex having a dry rubber content of about 27-31% was pumped to the mixing zone of the coagulum reactor. The latex flow rate was adjusted between about 650-720 kg/h in order to modify final carbon black loading levels and the relative proportions of natural rubber and synthetic latex.

Synthetic Latex Delivery

Styrene-butadiene latex (Nipol LX112, Zeon Corporation, Tokyo, Japan) was pumped to the mixing zone of the coagulum reactor for injection simultaneously with the natural rubber latex. The latex flow rate was adjusted between about 130-310 kg/h in order to modify final carbon black loading levels and the relative proportions of natural rubber and synthetic latex.

Carbon Black and Latex Mixing

The carbon black slurry, natural rubber latex, and synthetic latex were mixed by entraining the two latex streams into the carbon black slurry in a mixing portion of a coagulum reactor similar to that shown in FIG. 1. During the entrainment process, the carbon black was intimately mixed into the latex and the mixture coagulated.

Dewatering

The masterbatch crumb discharged from the coagulum reactor was dewatered to 10-20% moisture with a dewatering extruder (The French Oil Machinery Company, Piqua, Ohio). In the extruder, the masterbatch crumb was compressed, and water squeezed from the crumb was ejected through a slotted barrel of the extruder.

Drying and Cooling

The dewatered coagulum was dropped into a continuous compounder (Farrel Continuous Mixer (FCM), Farrel Corporation) where it was masticated and mixed with antioxidant. The moisture content of the masticated masterbatch exiting the FCM was around 1-2%. The product was further masticated and cooled on an open mill.

Curing

The cooled elastomer composite was compounded according to the formulation in Table 4 and the procedure outlined in Table 5.

TABLE 4

| Ingredient | Phr |
| --- | --- |
| Rubber | 100 |
| ZnO | 4 |
| Stearic acid | 2 |
| 6PPD* (antioxidant) | 1.5 |
| TBBS** (accelerator) | 0.8 |
| Sulfur | 1.2 |

*N-(1,3-dimethylbutyl)-N'-phenyl-p-phenylenediamine
**N-tert-butyl-2-benzothiazolesulphenamide

TABLE 5

| | Time (min) | Operation |
| --- | --- | --- |
| | | Farrel BR Banbury mixer (1600 cc), 75% fill factor, 80 rpm, 60° C. |
| | 0 | Add rubber-carbon black masterbatch |
| | 1 | Add zinc oxide, stearic acid and 6PPD |
| | 1.5 | Sweep |
| | 2.5 | Dump Roll mill using 4 cross-cuts and 2 end rolls Farrel BR Banbury mixer (1600 cc), 65% fill factor, 60 rpm, 50° C. |
| Stage 2 | 0 | Add stage 1 compound, sulfur and accelerator |
| | 1 | Dump Roll mill using 4 cross-cuts and 2 end rolls |

Vulcanization was carried out in a heated press set at 150° C. for a time determined by a conventional rubber rheometer (i.e., T90+10% of T90, where T90 is the time to achieve 90% vulcanization).

COMPARATIVE EXAMPLES—DRY MIXING

Dry mix elastomer blends were prepared from coagulated natural rubber and either SBR1500, a coagulated rubber available from Polimeri Europa (Milan, Italy) or coagulated Nipol LX112 (Zeon Corporation). Nipol LX112 was coagulated with 0.15 kg of aqueous 10% Ca(NO$_3$)$_2$ per kilogram of latex after adjusting the pH to 3 with 10% H$_2$SO$_4$. These materials were compounded using the formulation in Table 4, above and the procedure in Table 6.

TABLE 6

| Stage 1 | |
| --- | --- |
| Fill factor (%) | 75 |
| Rotor speed (rpm) | 80 |
| Start temperature (° C.) | 60 |
| Time NR addition (s) | 0 |
| Time CB addition (s) | 30 |
| Time smalls addition (s) | 150 |
| Time for sweep (s) | 60, 180 |
| Dump time (s) | 240 |
| Stage 2 | |
| Fill factor (%) | 65 |
| Rotor speed (rpm) | 60 |
| Start temperature (° C.) | 50 |
| Time masterbatch and curatives (s) | 0 |
| Dump time (s) | 60 |

Materials Characterization

The tensile stress of vulcanized samples (T300 and T100) were measured according to ASTM standard D-412. Tan delta 60° was determined using a dynamic strain sweep between 0.01% and 60% at 10 Hz and 60° C. Tan $\delta_{max}$ was taken as the maximum value of tan δ within this range of strains. Rebound was measured according to ASTM standard D7121.

Tan delta 30° was measured according to the following method: specimens were prepared by curing cylinders 16 mm in diameter and 10 mm in length between parallel plates coated with a Chemlok™ bonding agent. All test specimens were allowed to equilibrate in the test laboratory for at least 24 hours prior to testing, and all were allowed to warm-up for 15-20 minutes in the rheometer at the test temperature (30° C.). Samples were first strained to 25% at 1 Hz and held at 20% steady strain for 30 s before a strain sweep from 0.1% to 30%.

Macrodispersion was determined using a disperGrader available from Alpha Technologies (Akron, Ohio) according to the manufacturer's instructions. Vulcanized rubber is cut using the cutter available from Alpha Technologies. The freshly cut surface is then analyzed for undispersed area using the pre-programmed EXP_HISTOGRAM/30 Test. The average undispersed area is reported for each sample using three scans across three different areas of the sample.

Figure 4:
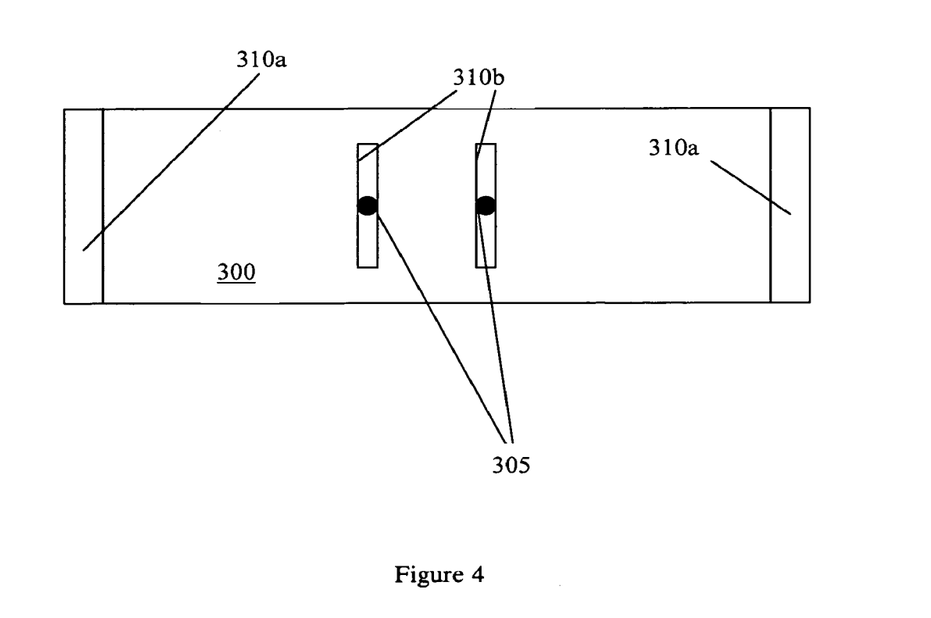
FIG. 4 is a schematic diagram illustrating the configuration of samples for electrical resistivity testing.

Electrical resistivity measurements were performed on wet masterbatch materials vulcanized according to CTV Method 1 and dry mix materials vulcanized according to CTV Comparative Method 1. After curing, the sheets produced from both wet masterbatch materials and dry mixed materials were rested for at least 24 hours. FIG. 4 shows the configuration of samples for electrical testing. Sheets 300 measuring 150 mm by 70 mm were measured at four points close to the points 305 for electrical contact. Both surfaces of the sample were cleaned by wiping with isopropyl alcohol, following which the sample was only handled with gloves. Silver paint was applied to both ends 310a of the sample and as two strips 310b near the center of the sample. A template was used to apply the center strips 310b of conductive paint. After the paint dried, the template was removed. The prepared sample was placed on a flat, non-conductive base, and current supply electrodes were attached by metal bars at each end of the sheet. Gold electrodes were lowered onto the center paint strips with their closest edges spaced exactly 10 mm apart using a spring-loaded device that applied constant load. These were used for voltage measurement. A signal generator was used to apply pulses of 50 ms duration, with a gap of 50 ms between pulses. The direction of the current was reversed for each pulse. The current was increased for each successive pulse and the voltage measured each time. The initial current and size of the current increments were chosen such that at least 50 data points were obtained over an output range of 0-10 V. The results were first checked to ensure that voltage was proportional to current. The resistance was then obtained from a linear regression of a plot of voltage against current. The measured resistance was converted to resistivity by multiplying it by the average sample thickness and dividing the result by the distance between the center electrodes (10 mm). All compounds were tested in triplicate, and the average result was used.

Results

Table 7 shows the values of T300/T100, tan delta, and macrodispersion for vulcanizates of wet masterbatch samples and dry mixed samples prepared as described above.

TABLE 7

| Masterbatch | Loading (phr) | SBR content (wt %) | T300/T100 | tan delta (60°) | tan delta (30°) | Rebound | Undispersed area (%) |
| --- | --- | --- | --- | --- | --- | --- | --- |
| Wet masterbatch | 39 | 20 | 5.73 | 0.176 | 0.179 | 53.6 | 0.06 |
|  | 55 | 30 | 5.87 | 0.246 | 0.267 | 40.0 | 0.08 |
|  | 57 | 36 | 5.87 | 0.252 | 0.282 | 38.6 | 0.04 |
| Dry mix (NR + SBR1500) | 39 | 20 | 5.17 | 0.168 | 0.182 | 52.2 | 0.44 |
|  | 55 | 30 | 5.10 | 0.235 | 0.268 | 42.8 | 0.14 |
|  | 57 | 36 | 5.06 | 0.236 | 0.273 | 42.2 | 0.16 |
| Dry mix (NR + Zeon SBR) | 39 | 20 | 4.83 | 0.168 | 0.189 | 49.5 | 1.21 |
|  | 55 | 30 | 4.76 | 0.242 | 0.294 | 38.1 | 1.07 |
|  | 57 | 36 | 4.48 | 0.256 | 0.308 | 37.3 | 0.69 |

The wet masterbatch materials exhibit superior microdispersion with respect to the dry mixed samples. This is reflected in the values of T300/T100 for the wet masterbatch and dry mixed samples. The superior performance of the wet masterbatch samples reflects the superior interaction and dispersion of the carbon black filler with respect to the elastomer.

Figure 5:
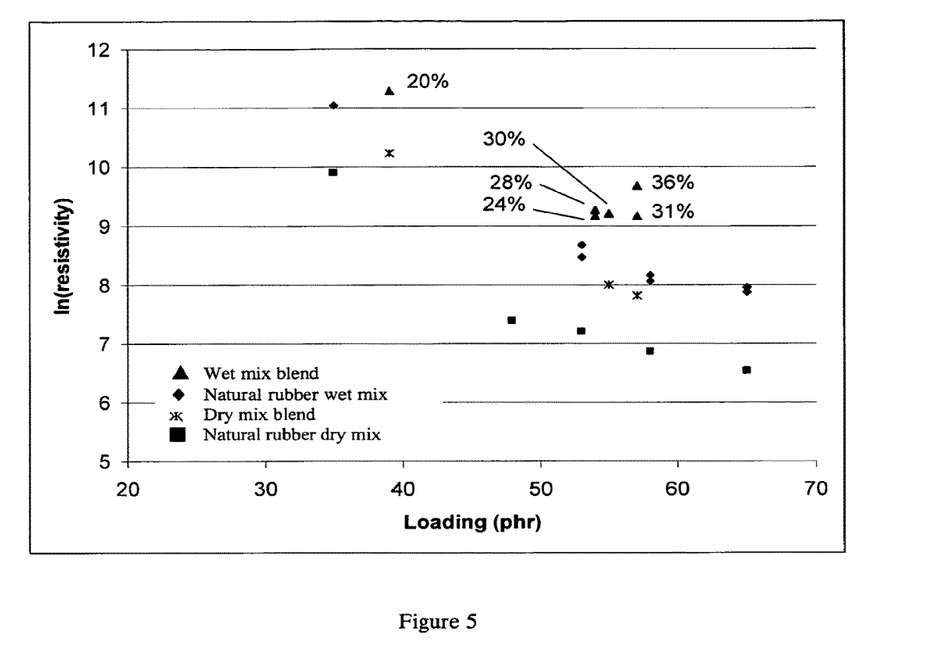
FIG. 5 is a graph of the natural log of resistivity with respect to loading levels of N234 carbon black comparing vulcanized elastomer composite blends produced according to an exemplary embodiment of the invention (triangles, numbers indicate the proportion of styrene-butadiene rubber by weight with respect to total rubber) to vulcanized elastomer composites produced from natural rubber latex via a wet masterbatch method (diamonds), vulcanized elastomer composite blends produced from natural rubber and styrene-butadiene rubber via a dry mixing method (stars), and vulcanized elastomer composites produced from natural rubber latex via a dry mixing method (squares).

FIG. 5 compares the resistivity of a number of samples, including dry mixed and wet masterbatch materials produced with only natural rubber latex, blends prepared by dry mixing SBR with a wet masterbatch material produced with natural rubber latex, and blends prepared by the wet masterbatch method described in the Examples. The masterbatches including only natural rubber latex were compounded using cyclohexyl benzothiazole sulfenamide (CBS) as the accelerator rather than TBBS. The difference in resistivity between these vulcanizates and vulcanizates prepared using TBBS as the accelerator is expected to be small. The results show that the resistivity of wet mix elastomer composite blends is higher than that of dry mix elastomer composite blends. In addition, the resistivity of both wet and dry mix elastomer composite blends is greater than that of the corresponding composites produced with only natural rubber latex.

The foregoing description of preferred embodiments of the present invention has been presented for the purposes of illustration and description. It is not intended to be exhaustive or to limit the invention to the precise form disclosed.

Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for preparing an elastomer composite, comprising:
feeding a first latex feed of a continuous flow of a first fluid comprising natural rubber latex to a mixing zone of a coagulum reactor;
feeding a second latex feed of a continuous flow of a second fluid comprising a synthetic elastomer latex to the mixing zone, the synthetic elastomer comprising a styrene-butadiene rubber;
feeding a continuous flow of a third fluid comprising a particulate filler slurry to the mixing zone;
allowing the natural rubber latex and the synthetic elastomer latex to coagulate with the particulate filler; and
discharging a flow of elastomer composite from a discharge end of the coagulum reactor,
wherein the first elastomer latex is incompatible with the second elastomer latex, and
wherein the first fluid and the second fluid combine with the third fluid to form a mixture, and wherein the first fluid and the second fluid combine with the third fluid and with each other substantially simultaneously or the first fluid and the third fluid combine to form a mixture, and wherein the second fluid combines with the mixture,
wherein the elastomer composite comprises natural rubber and about 1 to about 36% styrene-butadiene rubber with respect to total rubber content.

2. The method of claim 1, wherein the particulate filler comprises carbon black.

3. An elastomer composite prepared by a method comprising:
feeding a first latex feed of a continuous flow of a first fluid comprising natural rubber latex to a mixing zone of a coagulum reactor;
feeding a second latex feed of a continuous flow of a second fluid comprising a synthetic elastomer latex to the mixing zone, the synthetic elastomer latex being a styrene-butadiene rubber;
feeding a continuous flow of a third fluid comprising a particulate filler slurry to the mixing zone;
allowing the natural rubber latex and the synthetic elastomer latex to coagulate with the particulate filler; and
discharging a flow of elastomer composite from a discharge end of the coagulum reactor,
wherein the first fluid and the second fluid combine with the third fluid to form a mixture, and wherein the first fluid and the second fluid combine with the third fluid and with each other substantially simultaneously or the first fluid and the third fluid combine to form a mixture, and wherein the second fluid combines with the mixture,
wherein the elastomer composite comprises natural rubber and about 1 to about 36% styrene-butadiene rubber with respect to total rubber content.

4. The elastomer composite of claim 3, wherein the particulate filler comprises carbon black.

\* \* \* \* \*